UNITED STATES PATENT OFFICE.

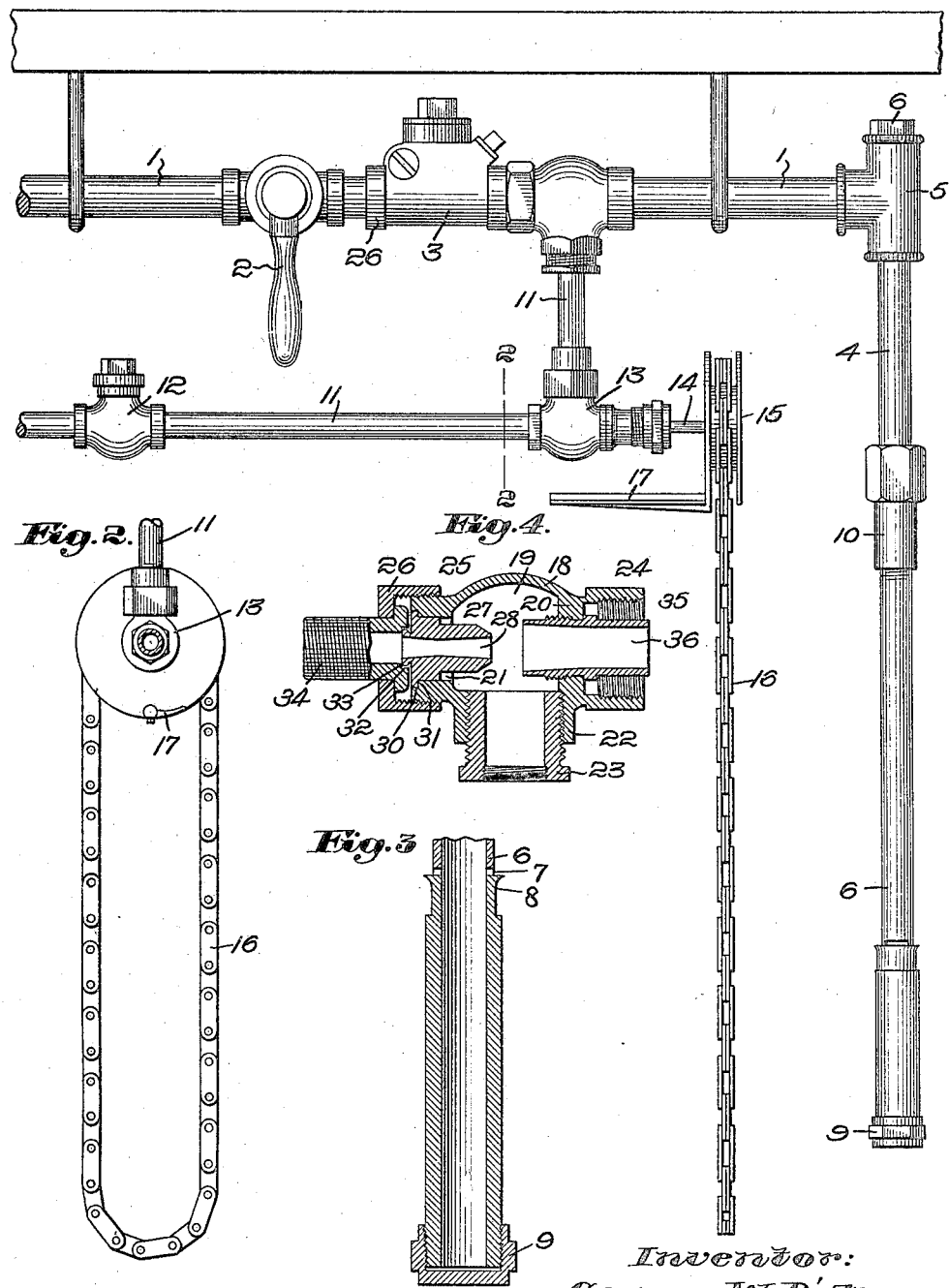

GEORGE W. D'ARCY, OF BOSTON, MASSACHUSETTS.

METHOD AND APPARATUS FOR HUMIDIFYING AIR.

1,302,515.   Specification of Letters Patent.   Patented May 6, 1919.

Application filed June 29, 1917. Serial No. 177,734.

*To all whom it may concern:*

Be it known that I, GEORGE W. D'ARCY, a citizen of the United States, and a resident of Boston, county of Suffolk, and Commonwealth of Massachusetts, have invented an Improvement in Methods and Apparatus for Humidifying Air, of which the following description, in connection with the accompanying drawings, is a specification, like characters on the drawings representing like parts.

This invention aims to provide a novel and improved method and apparatus for humidifying and cooling the air in buildings or chambers, and it is particularly adapted for use in textile mills and similar places where it is especially desirable and even necessary that a certain amount of humidity be always maintained in the atmosphere.

Obviously, for best results, the moisture should be diffused as evenly and completely as possible, and, for economy, the diffusing of the moisture should be effected from the smallest number of heads, or nozzles, that is practicable.

With the above objects in view, I have conceived the novel method and apparatus herein illustrated and described.

My invention contemplates the use of steam and water, both under pressure, and I have found that whatever the water pressure may be, the steam pressure may be from 10 to 15 pounds or more, less than the pressure of the water.

In the drawings of the embodiment of my invention illustrated and described herein, Figure 1 is a side elevation of the apparatus shown suspended from the ceiling of a room;

Fig. 2, a view on the line 2—2, Fig. 1, looking from the left;

Fig. 3, a vertical, sectional detail of the diffusing head, on an enlarged scale, and Fig. 4, a vertical, sectional detail of the vaporizing member and connections.

Referring, first, to Fig. 1 of the drawings, my improved apparatus comprises a steam supply pipe 1, leading from any convenient source, not shown, but which may ordinarily be the usual power plant of the mill, this pipe being provided with a usual shut-off cock 2 and check valve 3, both of which valves may be of any conventional and satisfactory type.

The pipe 1, at its opposite end, obviously may be bent downwardly to form an extension 4, or it may be provided with a T 5 of conventional form, into which the pipe 1 and a separate pipe 4 may be threaded in the usual manner, a plug 6 in the upper end of the T, forming a convenient means for obtaining access to the vertical pipe 4, if necessary, and also providing an inexpensive means for closing the upper end of the T.

At its lower end, Fig. 1, the pipe 4 is provided with a diffusing member 6, herein shown, as comprising a pipe of suitable length having laterally opening apertures 7, therein, near its lower end, the end of the member 6 being closed by any convenient means, as a cap 9. The diffusing member is shown herein as connected to the pipe 4 by means of a union 10.

Leading to pipe 1, at any convenient point, but preferably some distance back from the T 5, is a water pipe 11, connecting with any suitable source of supply, not shown, this pipe being provided also with a check valve 12 and needle valve 13, for controlling the supply of water to the desired degree.

For conveniently operating this valve from the floor, its stem 14, Fig. 1, may be provided with a sprocket wheel 15 and chain 16, of suitable length. If desired, the wheel 15 may have a finger 17 laterally extended therefrom, and adjusted to engage any convenient stop, as the pipe 11, to limit the extent to which the valve 13 may be opened under any conditions.

The pipe 11 may be connected to the pipe 1 by any convenient form of connection, as a T, like the member 5, at the end of pipe 1, and most satisfactory results will be obtained from my apparatus as thus constructed compared with the humidifying apparatus in common use.

Nevertheless, I have discovered that if a mixing and churning chamber is provided, where the steam and water meet, and where the steam may operate to preliminarily churn the water, prior to the final vaporization thereof in the head 6, the result is still more satisfactory, and particularly favorable results may be obtained in respect to economy of operation.

To that end, I prefer to provide my apparatus with a mixing and churning chamber shown in Fig. 1 and Fig. 4, as consisting of a body 18, having a chamber 19 therein, the body being provided with end walls 20 and 21, and having a neck 22 to receive the pipe 11, or as in this case, bushing 23, which, in turn, may be connected to the pipe 11.

The body 18, Fig. 1, may be provided with any suitable connecting means for receiving the opposite ends of the pipe 1, or other connecting members, in lieu thereof and herein, has, on one end, an internally threaded neck 24, and on its opposite end an externally threaded neck 25, which latter may receive a union 26.

I have found that if the steam is introduced into the chamber 19 through a small nozzle-like receiving member 27, best results are obtained, and herein this member is shown as having a gradually contracting and then expanding throat 28 for that purpose. The member itself is provided with a flange 30 at its outer end, which seats against a shoulder 31 in the end wall 21 of the body 18, the nozzle also having a narrow flange 32 on its outer end and adjacent the passage 28, which flange seats against a shoulder 33 in the nipple 34 of the union 26, which acts thus to retain the nozzle 27 firmly on its seat.

Opposite the end of the nozzle 27 is provided a larger discharging nozzle 35, the passage 36 in which is gradually contracted toward its outer end, and which may be threaded into the wall or end 20 of the member 18 for convenience. Best results are obtained by positioning the nozzles 27 and 35 somewhat apart, and each of them a little to one side of the vertical center of the bushing 23. Apparently the fact that the ends of the admission and discharge nozzles both extend inwardly from the opposite walls of the chamber 19 has some effect upon the thorough vaporization of the water by the steam. I attribute this result to the fact that the water is not forced directly out from the chamber 19 by the jet of steam, as might be the case, if for instance the inner end of the discharge nozzle 36 were flush with the wall of the chamber 19. On the contrary the inwardly extended ends of both nozzles 27 and 35 result in the water being thoroughly vaporized by the steam jet in the chamber about the nozzle ends, and it compels the vapor to travel backwardly toward the admission nozzle somewhat before it can enter the end of the discharge nozzle. It will be obvious that in this chamber which is larger than the diameter of either pipe, the steam and water must become thoroughly diffused.

In practice, my improved method and apparatus are used as follows:

Steam is first admitted to the pipe 1 by turning the cock 2, preferably to its full extent. Valve 13 is then opened to the required extent, permitting water to flow through pipe 11 and meet the steam in pipe 1, provided no mixing chamber is used, otherwise, steam and water will meet in the mixing chamber 19.

In the former case, when the steam encounters the water in the pipe 1, it acts by its heat and force to break up the water into a vapor so fine that it is thoroughly disseminated and diffused as it leaves the head 6 through the apertures 7.

While the exact quantity of the water that is to be fed through the valve 13 need not be determined precisely, nevertheless, best results will be obtained by feeding to the steam only that quantity of water which will be most thoroughly vaporized and diffused. Too much water will result in the vapor being so heavy that an excess of moisture will be discharged from the head 6, and less than the maximum area of air space will be properly humidified.

Where, however, my improved churning chamber 19 is used, marked increase in economy in the use of steam is obtained, in addition to the good results hereinafter noted. I attribute this result to the fact that, by feeding the steam into the chamber 19 through the contracted throat 28, and permitting it to there meet the water from pipe 11, the water is churned and agitated over and over in the chamber and vaporization is effected more thoroughly than where the vaporization is carried out in the pipe 1, and without the chamber 19, while the steam and water are on the way to the head 6.

Apparently, on issuing from the throat 28, a portion of the steam in the chamber 19 acts to thoroughly churn and break up the water particles from pipe 11, completely vaporizing the same, and another portion of the steam acts simultaneously as a vehicle for carrying the vapor with it through the passage 36, to the head 6, the vaporization being effected by a great deal less steam pressure than is the case where vaporization is effected in the pipes 1 and 4.

Inasmuch as the water is fed through pipe 11 under pressure, the action of the steam is relieved from any lifting or like duty respecting the water, and its entire energy is consumed in vaporizing the water as fed to it.

I have ascertained, by careful experiment, that substantially 50% less quantity of steam is required to humidify the same quantity, by weight, of water, when the vaporizing chamber 19 is used, than is the case where the water is introduced direct into the pipe 1, and the vaporization effected therein. This represents a most substantial saving of steam and of course coal.

I am aware that at this time humidifying apparatus designed to use water without pressure and a current of compressed air, is in use. This method, however, requires the installation of an expensive air-compressor, and the air-compressor is expensive to operate.

When air is used as a diffusing agent, its temperature is ordinarily less than that of steam, and consequently the extent of the diffusion of the water depends largely, of course, upon the pressure under which the air is used. Therefore, the diffusion being obtained by air pressure, it is limited in degree, and the vapor is diffused over a substantially small area, at an unnecessary expense.

It will be obvious that it is impracticable to materially increase the temperature of the air to aid in diffusing the water, except by simultaneously increasing the pressure of the air to a degree that renders its use inconvenient and still more expensive.

When steam is used, however, the water is not diffused alone by the pressure of the steam, but also by its temperature, the result being that the diffusion is far more complete and the vapor is consequently spread over an area greater in extent than is the case where air is used instead of steam.

Furthermore, by the use of steam instead of air, the humidifying of the air is much more quickly accomplished because the steam and the water vaporized thereby are both moist by nature, while air is not.

Again, when compressed air is used as a vaporizing and diffusing agent there is apt to be a noticeable draft throughout the room, particularly if the air is used under high pressure. This I attribute to the fact that air is ordinarily heavier than steam and is not, therefore, so thoroughly mingled with the water vapor as is the steam, and accordingly its discharge into the room by the diffusing head 6 is apt to create slight air currents referred to.

While I have shown and described herein one embodiment of my invention, it will be obvious that the same may be modified in certain details within the spirit of my invention and the following claims.

Claims:

1. The method of humidifying air comprising the introduction of a jet of steam into a churning chamber through an admission nozzle, introducing a jet of water under pressure also into said churning chamber at a sharp angle to the direction of the steam jet, across a discharge nozzle opening, and between the admission and discharge nozzles to churn and vaporize the water, and subsequently discharging the vapor through the discharge nozzle.

2. The method of humidifying air comprising the introduction of a jet of steam into a churning chamber through an admission nozzle, subsequently introducing a jet of water under greater pressure into said chamber at a sharp angle to the direction of the steam jet, across a discharge nozzle opening, and between the admission and discharge nozzles to churn and vaporize the water, and subsequently discharging the vapor from substantially the center of the churning chamber and through the discharge nozzle.

3. Humidifying apparatus comprising in combination a liquid churning chamber, an admission nozzle leading thereto, a discharge nozzle leading from approximately the center of the chamber, a liquid admission opening in the chamber wall in a plane between the admission and discharge nozzles, so positioned that the liquid admitted to the chamber will pass between the admission and discharge nozzle ends.

In testimony whereof, I have signed my name to this specification.

GEORGE W. D'ARCY.

Copies of this patent may be obtained for five cents each, by addressing the "Commissioner of Patents, Washington, D. C."